US006718802B2

(12) United States Patent  (10) Patent No.: US 6,718,802 B2
Vito  (45) Date of Patent: Apr. 13, 2004

(54) TAMPER RESISTANT LOCK

(76) Inventor: Robert A. Vito, 1434 Sugartown Rd., Berwyn, PA (US) 19312

( * ) Notice: Subject to any disclaimer, the term of this patent is extended or adjusted under 35 U.S.C. 154(b) by 0 days.

(21) Appl. No.: 10/243,239

(22) Filed: Sep. 13, 2002

(65) Prior Publication Data

US 2004/0045328 A1 Mar. 11, 2004

Related U.S. Application Data

(63) Continuation-in-part of application No. 29/166,890, filed on Sep. 5, 2002.
(51) Int. Cl.$^7$ .......................... E05B 71/00; E05B 73/00
(52) U.S. Cl. .................. 70/18; 70/38 A; 70/39; 70/52; 70/53; 70/54; 70/55; 70/233; 70/417
(58) Field of Search .................. 70/18, 38 A, 39, 70/52, 53, 54–56, 233, 417, 14, 234, 235

(56) References Cited

U.S. PATENT DOCUMENTS

| 153,312 A | | 7/1874 | Broome et al. | |
|---|---|---|---|---|
| 323,185 A | * | 7/1885 | McCarter | |
| 348,521 A | * | 8/1886 | Hillebrand | |
| 596,237 A | * | 12/1897 | Damon | |
| 885,253 A | * | 4/1908 | Hummel | |
| 1,337,568 A | | 4/1920 | Shannon et al. | |
| 1,503,210 A | | 7/1924 | Shannon | |
| 2,048,571 A | * | 7/1936 | Slaymaker | |
| 3,004,421 A | * | 10/1961 | Bowler | 70/232 |
| 3,754,418 A | | 8/1973 | Miller | 70/18 |
| 3,754,420 A | | 8/1973 | Oellerich | 70/58 |
| 3,800,570 A | | 4/1974 | Kaplan | 70/18 |
| 3,924,426 A | | 12/1975 | Zane et al. | 70/18 |
| 4,112,716 A | * | 9/1978 | Wippich | 70/38 C |
| 4,155,231 A | | 5/1979 | Zane et al. | 70/18 |
| 4,290,279 A | * | 9/1981 | Fish et al. | 70/38 A |
| 4,524,591 A | * | 6/1985 | Lanka | 70/236 |
| 4,545,224 A | | 10/1985 | Zane | 70/39 |
| 4,736,921 A | | 4/1988 | Zane et al. | 248/316.2 |
| 4,953,371 A | * | 9/1990 | Appelbaum | 70/32 |
| 4,955,932 A | * | 9/1990 | Kofman | 70/39 |
| 5,010,746 A | | 4/1991 | Zane et al. | 70/39 |
| 5,092,142 A | | 3/1992 | Zane et al. | 70/39 |
| 5,467,620 A | * | 11/1995 | Byrd, Jr. | 70/38 A |
| 5,488,844 A | * | 2/1996 | Winner | 70/18 |
| 5,535,609 A | * | 7/1996 | Kuo | 70/423 |
| 5,647,520 A | | 7/1997 | McDaid | 224/425 |
| 5,706,679 A | | 1/1998 | Zane et al. | 70/18 |
| 5,794,462 A | | 8/1998 | Steele et al. | 70/18 |
| 5,921,116 A | * | 7/1999 | Goldenberg | 70/18 |
| 6,321,961 B1 | | 11/2001 | McDaid et al. | 70/233 X |
| 6,422,442 B1 | | 7/2002 | McDaid et al. | 70/49 X |
| 6,470,720 B1 | * | 10/2002 | Yang et al. | 70/209 |

FOREIGN PATENT DOCUMENTS

| AU | 90520 | * | 12/1922 | | 70/18 |
|---|---|---|---|---|---|
| FR | 2671578 | * | 7/1992 | | 70/54 |
| GB | 228146 | * | 5/1925 | | 70/18 |
| GB | 2157756 | * | 10/1985 | | 70/233 |
| GB | 2169343 | * | 7/1986 | | 70/54 |
| SE | 122171 | * | 7/1948 | | 70/18 |

* cited by examiner

Primary Examiner—Llyod A. Gall
(74) Attorney, Agent, or Firm—Volpe and Koenig, P.C.

(57) ABSTRACT

A lock that is tamper resistant and includes a lock member. Two tubes are disposed on the lock member. Each of the two tubes extend generally outwardly therefrom and each define a bore therethrough. The lock includes a closure member which has two shafts. The two shafts are inserted through the two tubes and detachable within the lock member when the lock is an installed configuration. A locking mechanism detachably locks the closure member to the lock member when the lock is in the installed configuration wherein the two tubes substantially cover the two shafts.

28 Claims, 13 Drawing Sheets

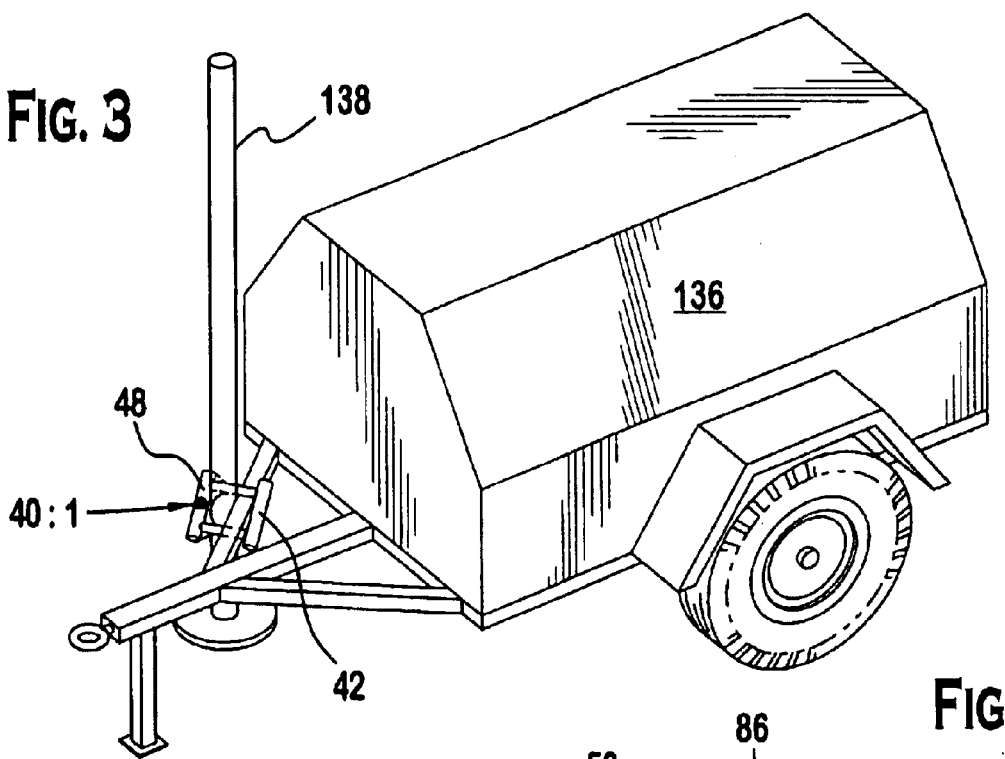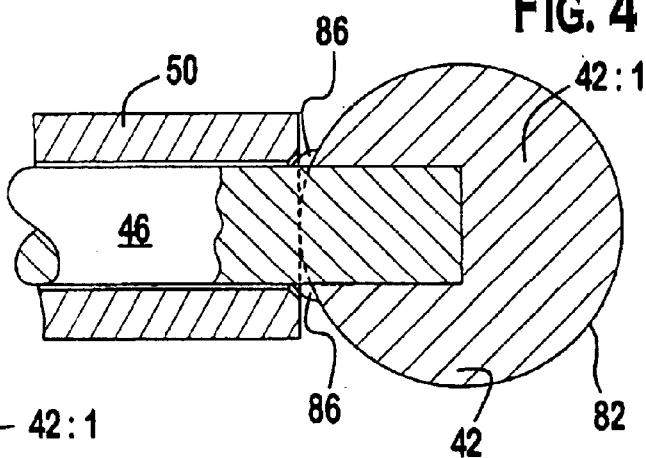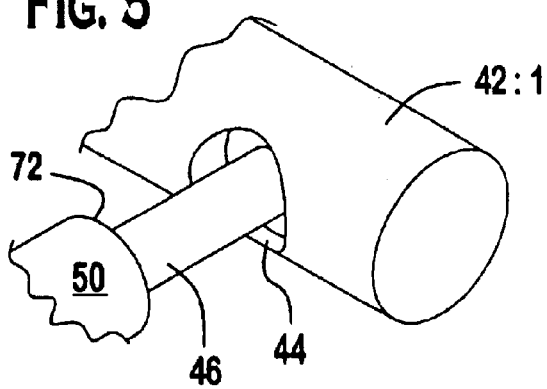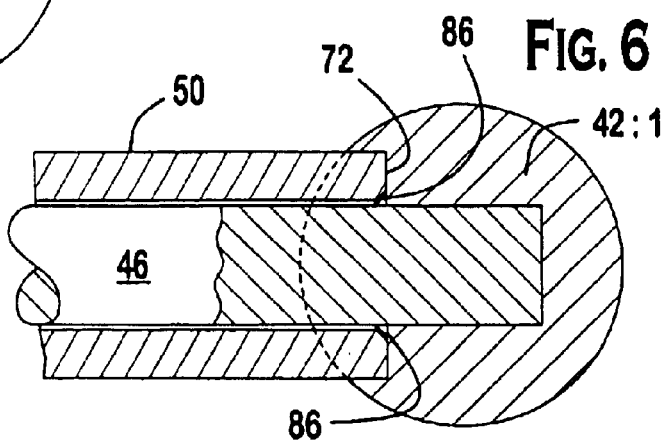

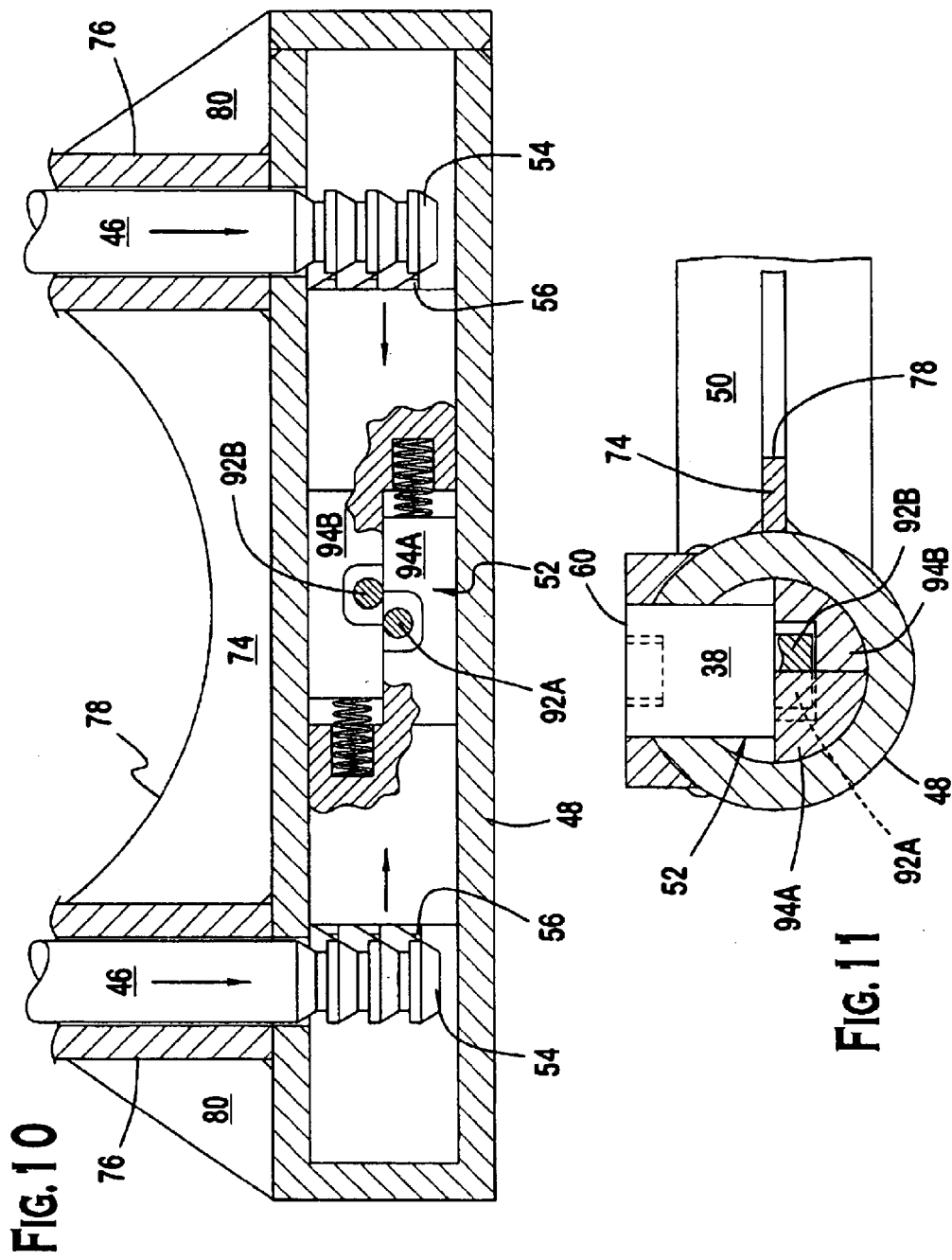

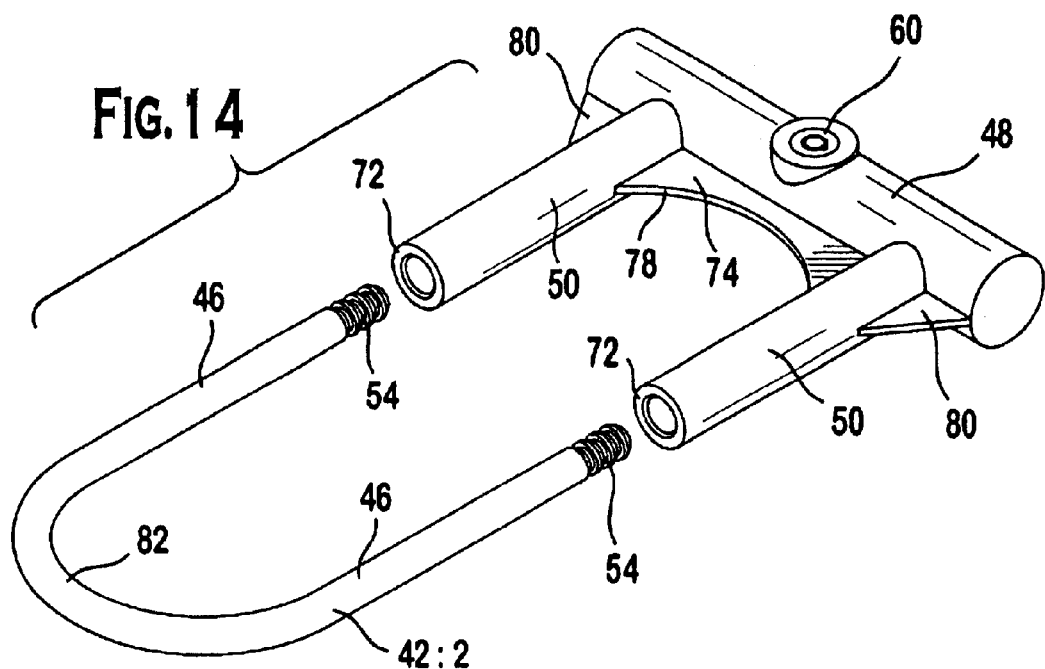
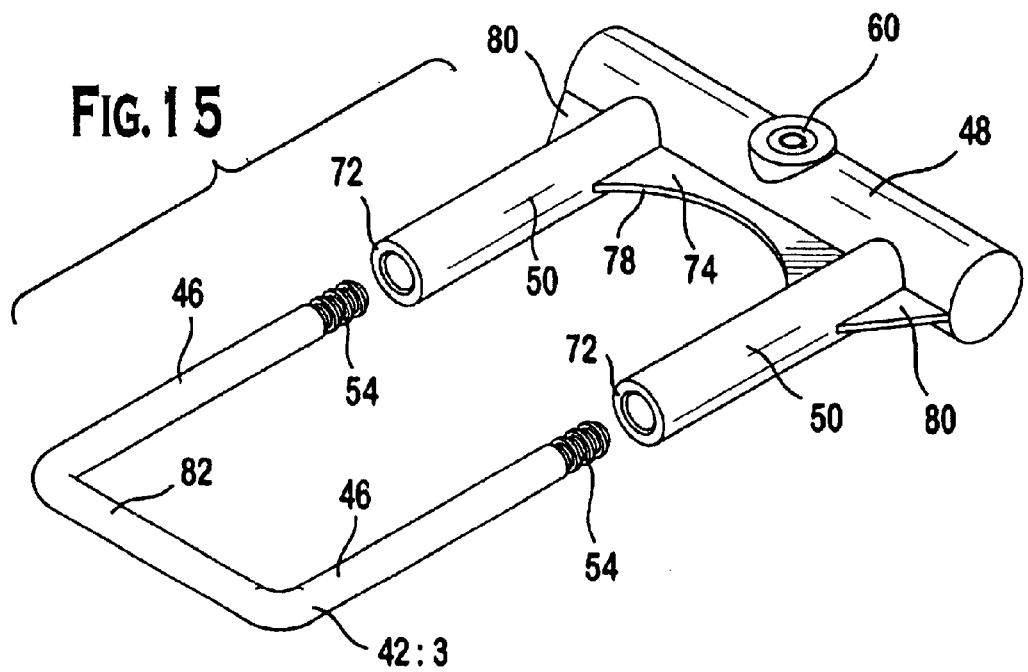

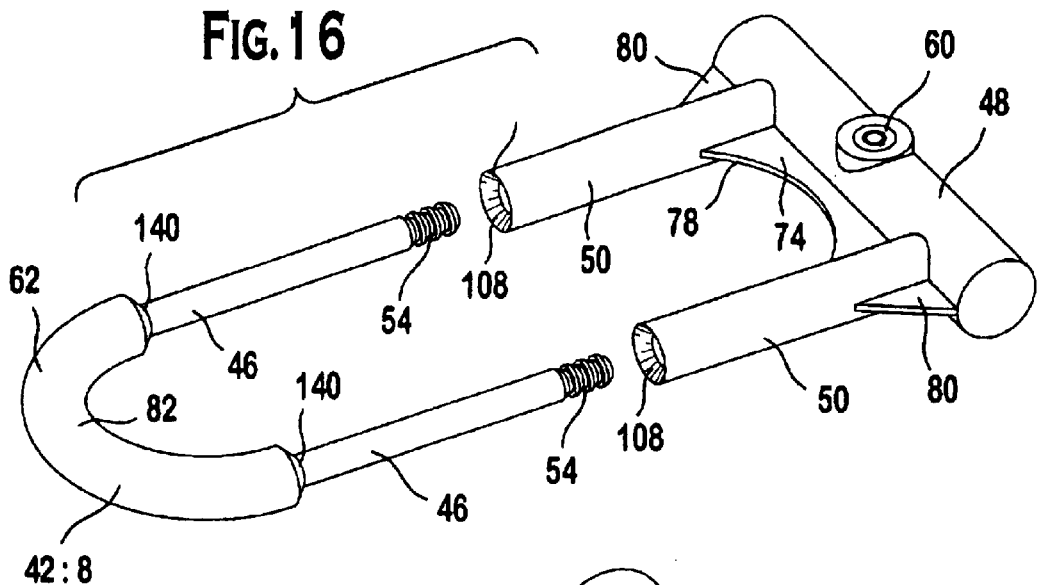
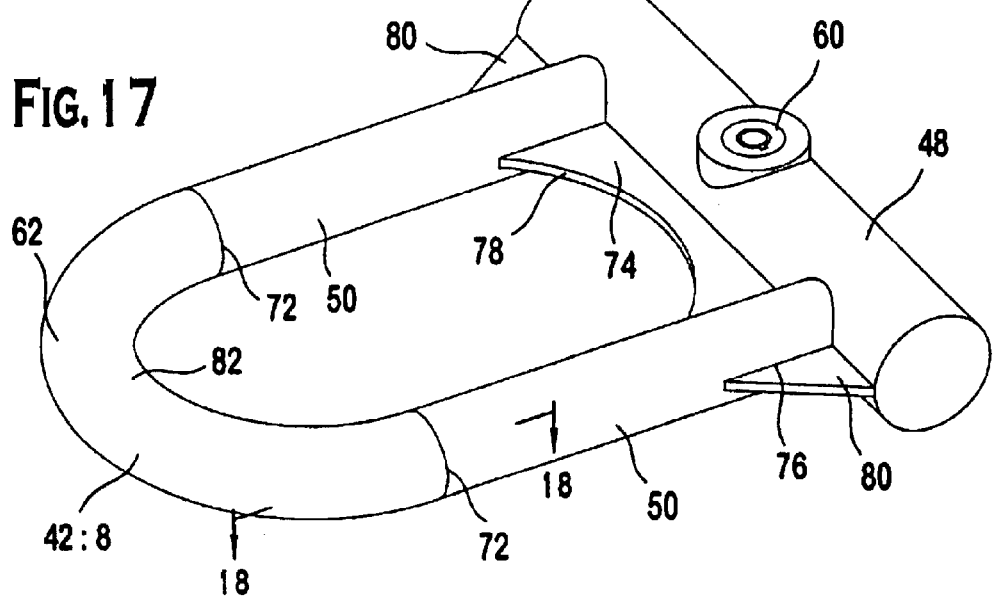
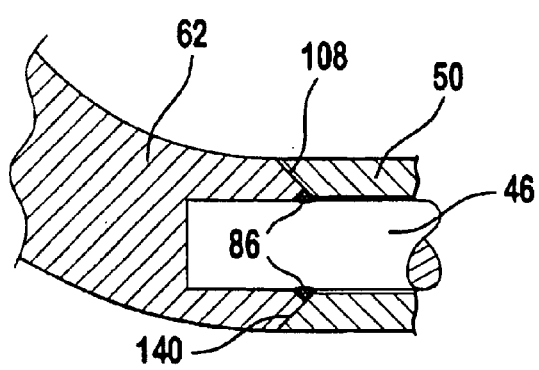

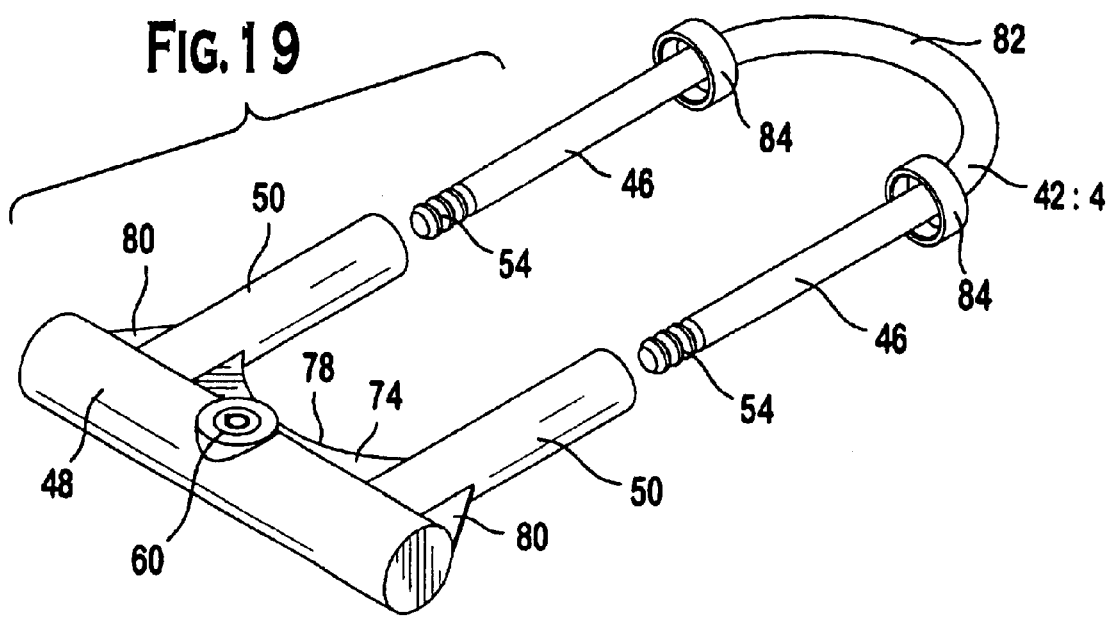
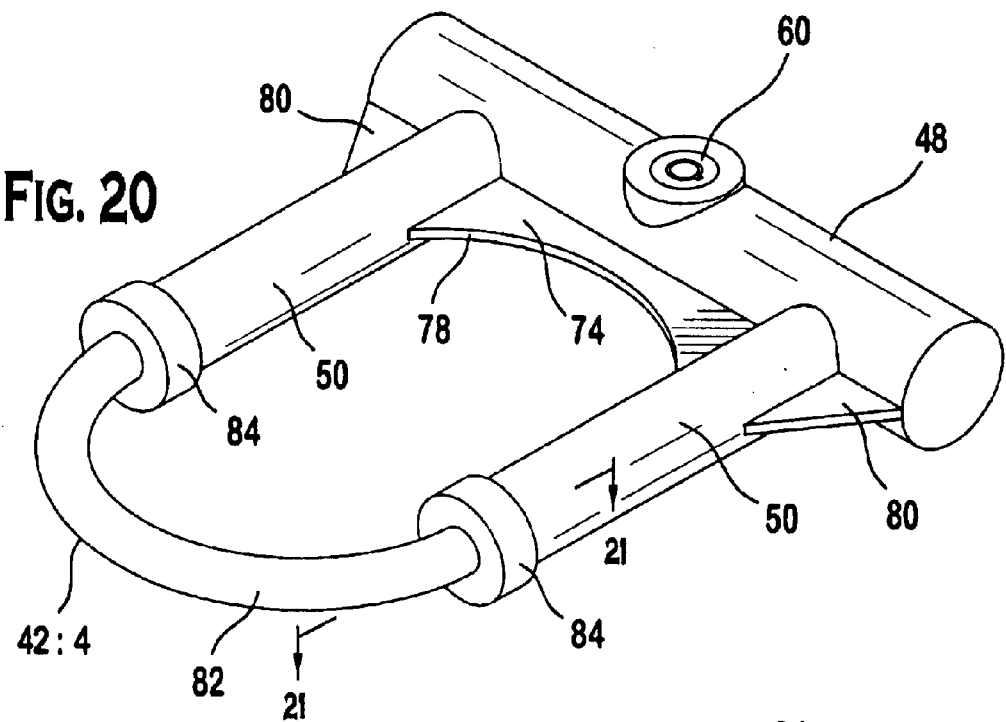
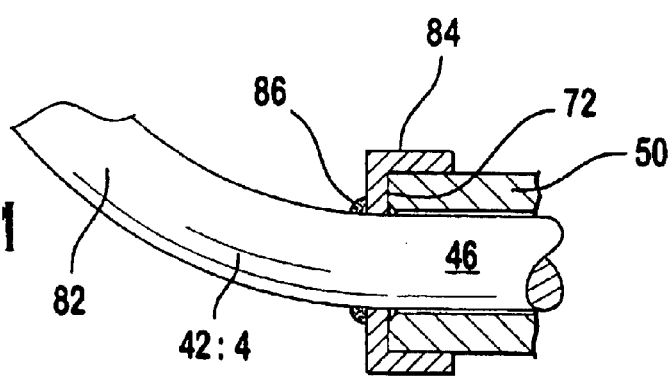

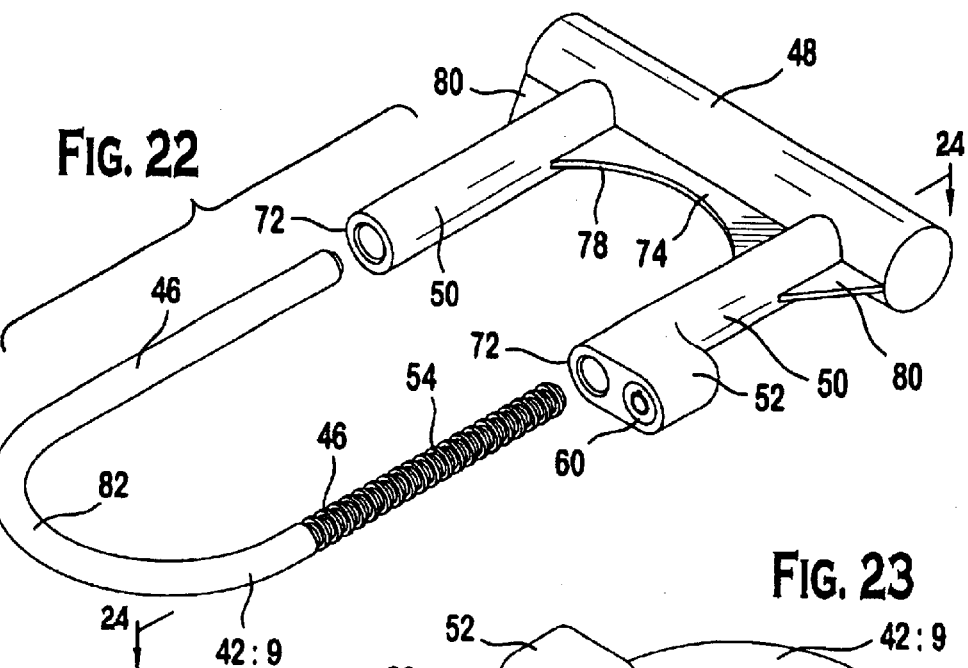
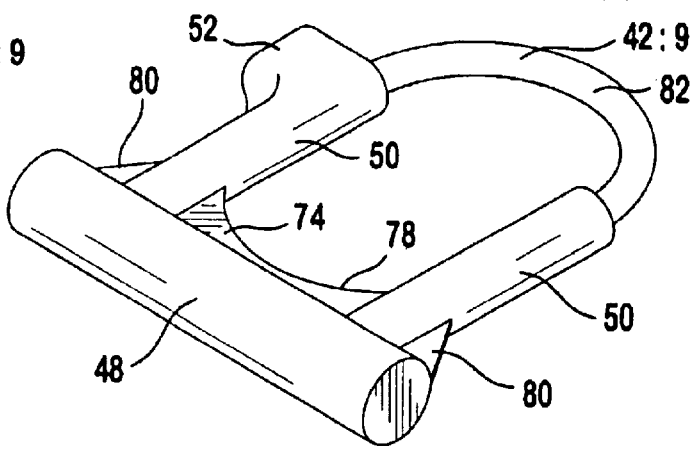
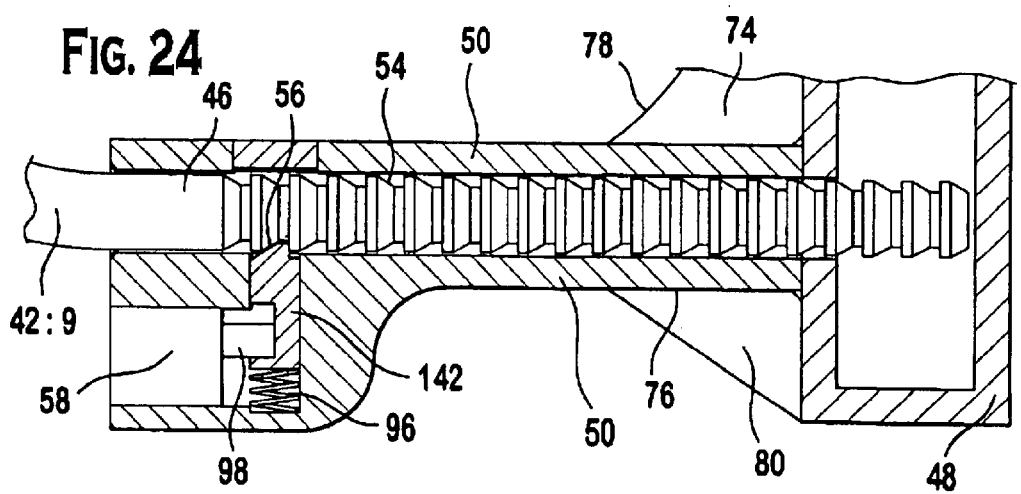

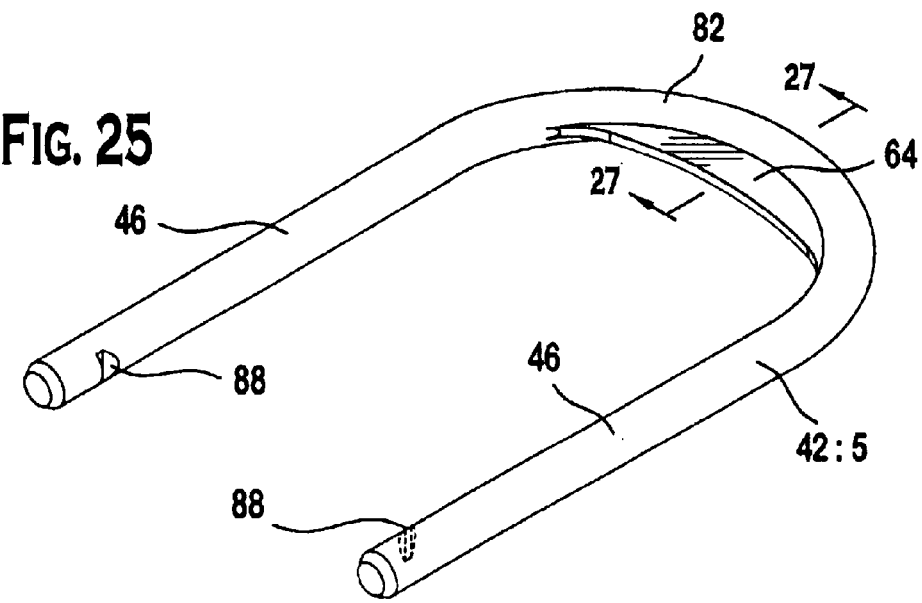
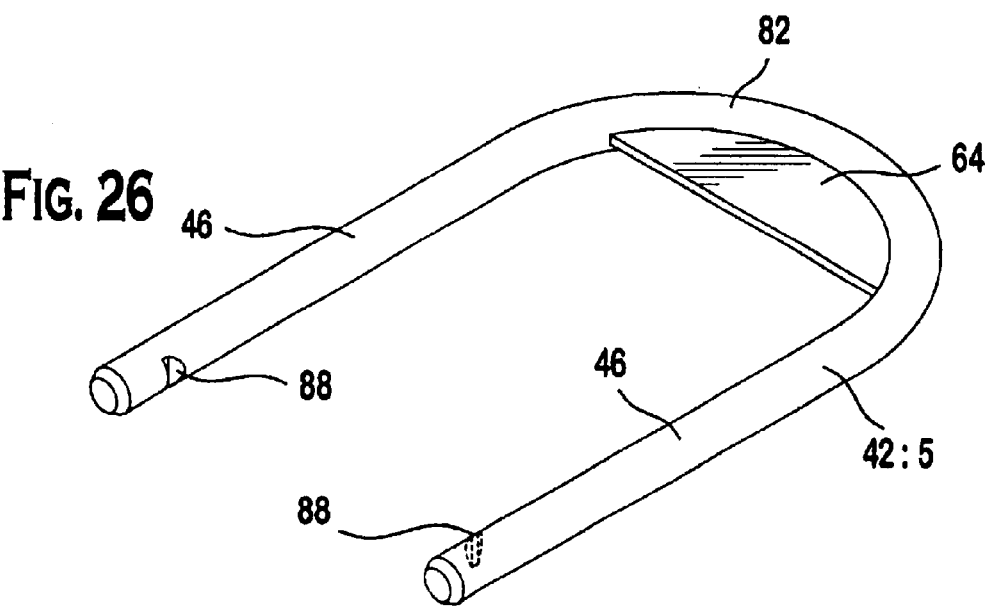
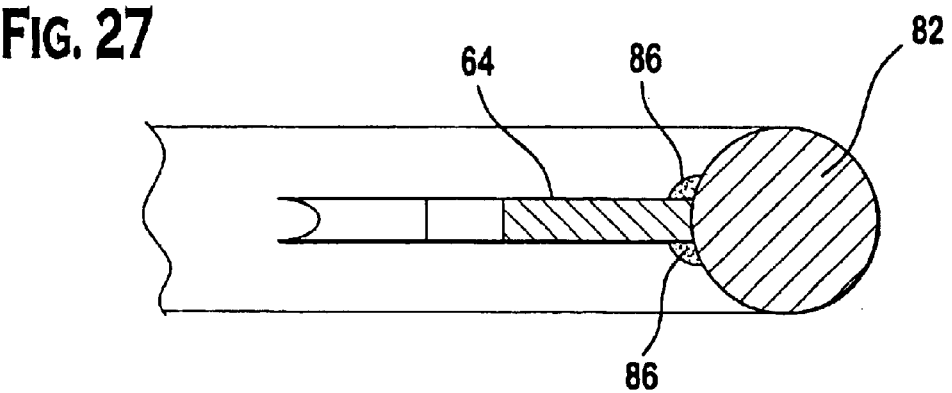

TAMPER RESISTANT LOCK

CROSS REFERENCE TO RELATED APPLICATION

This application claims priority form and is a continuation in part of U.S. Design patent application Ser. No. 29/166,890, entitled "Closure Receiving lock Element," filed on Sep. 5, 2002, invented by Mr. Robert A. Vito, the disclosure of which is incorporated herein by reference.

BACKGROUND

The present invention is directed to a tamper resistant lock and, more specifically, is directed to a reinforced lock that engages a lock closure member in a manner that prevents the lock from being disabled.

Referring to FIG. 31, a typical lock 110, similar to those commonly used with bicycles, is shown. The lock 110 has a U-shaped shackle 112 with two legs 114 that are engageable with a crossbar 116. The crossbar 116 is typically cylindrical and formed of low quality steel 118 covered by rubber 120. A left lock end 122 is typically formed of rubber only. The lock 110 is secured in the engaged position by inserting a bent foot 124 into a first hole 126A and rotating the U-shaped shackle 112 until a notch bearing end 128 is inserted into a second hole 126B. Once the U-shaped shackle 112 is engaged with the crossbar 116, a lock 130 is manipulated to engage lock member 132 with a notch 134 in the notch bearing leg end 128. The lock member is only secured in the U-shaped shackle 112 by metal sliver 133 which is typically an eighth of an inch or less in thickness of generally brittle steel.

While many years ago the above described conventional lock 110 was initially successful, today's thieves are well aware of many common techniques for quickly and easily disabling such locks. For example, a crowbar, or similar lever is commonly inserted between the legs 114 and, in combination with a fulcrum (which may consist of a lamppost, bike frame, bike rack, or other structure that the lock encloses), spreads the legs 114 generally outwardly causing either the bent foot 124 or the notch bearing end 128 to be disengaged from the crossbar 116. Typically it is the thin metal sliver 133 that is broken from the U-shaped shakle which allows a thief to easily remove the lock. The breaking of the thin metal sliver 133 to remove the lock 110 is why so many disabled locks 110 are found with a broken metal piece inside the crossbar 116. Alternatively, a hardened member can be driven through the rubber end 122 of the lock 110 to deform the bent foot 124 sufficiently to remove the crossbar 116 from the U-shaped shackle 112.

The easy disabling of the lock 110 makes such locks unsuitable for use today. Due to the growing popularity of cycling and other outdoor recreational activities, more expensive and specialized sporting equipment such as mountain bikes with shock absorbing members and ultralight composite touring bicycles have been developed. With the increased value of bicycles and other recreational equipment, it is no longer acceptable to use the locks 110 currently available to secure one's possessions.

Clearly, what is needed is an improved tamper resistant lock, that is easy to install, that preferably does not have a rubber end, that can not easily be dismantled using a crowbar or the like, and that is configured to allow use with sporting equipment, such as bicycles, or with any other items, such as to secure metallic shutters used to cover store fronts or the like.

SUMMARY

One embodiment of the present invention is directed to a lock that is tamper resistant and includes a lock member. Two tubes are disposed on the lock member. Each of the two tubes extend generally outwardly therefrom and each define a bore therethrough. The lock includes a closure member which has two shafts. The two shafts are inserted through the two tubes and detachable within the lock member when the lock is an installed configuration. A locking mechanism detachably locks the closure member to the lock member when the lock is in the installed configuration wherein the two tubes substantially cover the two shafts.

Another embodiment of the present invention is directed to a lock that is tamper resistant. The lock includes a lock member having a generally elongated shape and a longitudinal axis. Two tubes are disposed on the lock member. Each of the two tubes extends generally outwardly therefrom and each define a bore therethrough. Each of the two tubes extends generally perpendicularly to the longitudinal axis. A closure member includes a transverse part having an outer surface and two shafts located on the outer surface. The two shafts are inserted through the two tubes and detachably lock within the lock member when the lock is an installed configuration. A locking mechanism detachably locks the closure member to the lock member when the lock is in the installed configuration wherein the two tubes, in combination with the lock member, completely enclose the two shafts.

BRIEF DESCRIPTION OF THE DRAWINGS

The foregoing summary, as well as the following detailed description of the preferred embodiments of the present invention, will be better understood when read in conjunction with the appended drawings. For the purposes of illustrating the invention, there are shown in the drawings embodiments which are presently preferred. It is understood, however, that the invention is not limited to the precise arrangements and instrumentality shown. In the drawings:

FIG. 3 is perspective view of the lock of FIG. 1 securing a trailer to a lamppost;

FIG. 4 is a cross-sectional view of a portion of a closure member of FIG. 2 as taken along the line 4—4 of FIG. 2 illustrating a first preferred method of making the closure member;

FIG. 5 is a perspective partial view of a second embodiment of the closure member of FIG. 1 illustrating a groove extending around a perimeter of a shaft of the closure member;

FIG. 6 is cross-sectional view similar to that of FIG. 4 illustrating a tube of the lock member enclosing the shaft of the closure member and extending into the recess of FIG. 5;

FIG. 10 is view similar to FIG. 9 illustrating the insertion of the shafts of the closure member into the lock member and the abutment of ratchets along the shaft with catches of the locking mechanism to allow the lock to be moved into the installed configuration and secured without a user having to adjust the lock mechanism;

FIG. 11 is cross-sectional view of the lock of FIG. 2 as taken along the line 11—11 of FIG. 2 illustrating the preferred tumbler and lock mechanism;

FIG. 14 is an exploded perspective view of the lock member of FIG. 1 used with the second preferred embodiment of the closure member which is generally U-shaped;

FIG. 15 is exploded perspective view of the lock member of FIG. 1 used with the third preferred embodiment of the closure member which has a generally rectilinear three sided shape;

FIG. 16 is an exploded perspective view of a third preferred embodiment of the lock according to the present invention illustrating the closure member having a thickened portion that is preferably sized to be flush with the tubes of the lock member when the lock is in the installed configuration;

FIG. 17 is a perspective view of the lock of FIG. 16 in the installed configuration;

FIG. 18 is cross-sectional view of the lock of FIG. 17 as taken along the line 18—18 of FIG. 17 illustrating the flush engagement of the thickened portion of the closure member with the tube disposed on the lock member;

FIG. 19 is an exploded perspective view of the lock member of FIG. 1 ready to receive a fourth preferred embodiment of the closure member;

FIG. 20 is a perspective view of the lock of FIG. 19 in the installed configuration;

FIG. 21 is a cross-sectional view of the lock of FIG. 20 as taken along the line 21—21 of FIG. 20 illustrating the engagement between one shaft of the closure member and a tube disposed on the lock member;

FIG. 22 is an exploded perspective view of a fourth preferred embodiment of a lock according to the present invention which is adjustable in size;

FIG. 23 is perspective view of the lock of FIG. 22 in the installed configuration;

FIG. 24 is cross-sectional view similar to the view shown in FIG. 21 as taken along line 24—24 of FIG. 22 that illustrates the engagement of the closure member with the lock member when the lock is in the installed configuration;

FIG. 25 is perspective view of a fifth preferred embodiment of the closure member illustrating a reinforcement flange positioned to reinforce the closure member;

FIG. 26 is perspective view of a sixth preferred embodiment of the closure member illustrating another reinforcement flange that can be used to reinforce the closure member;

FIG. 27 is cross-sectional view the closure member of FIG. 25 as taken along the line 27—27 of FIG. 25;

DETAILED DESCRIPTION OF THE PREFERRED EMBODIMENTS

Figure 1:
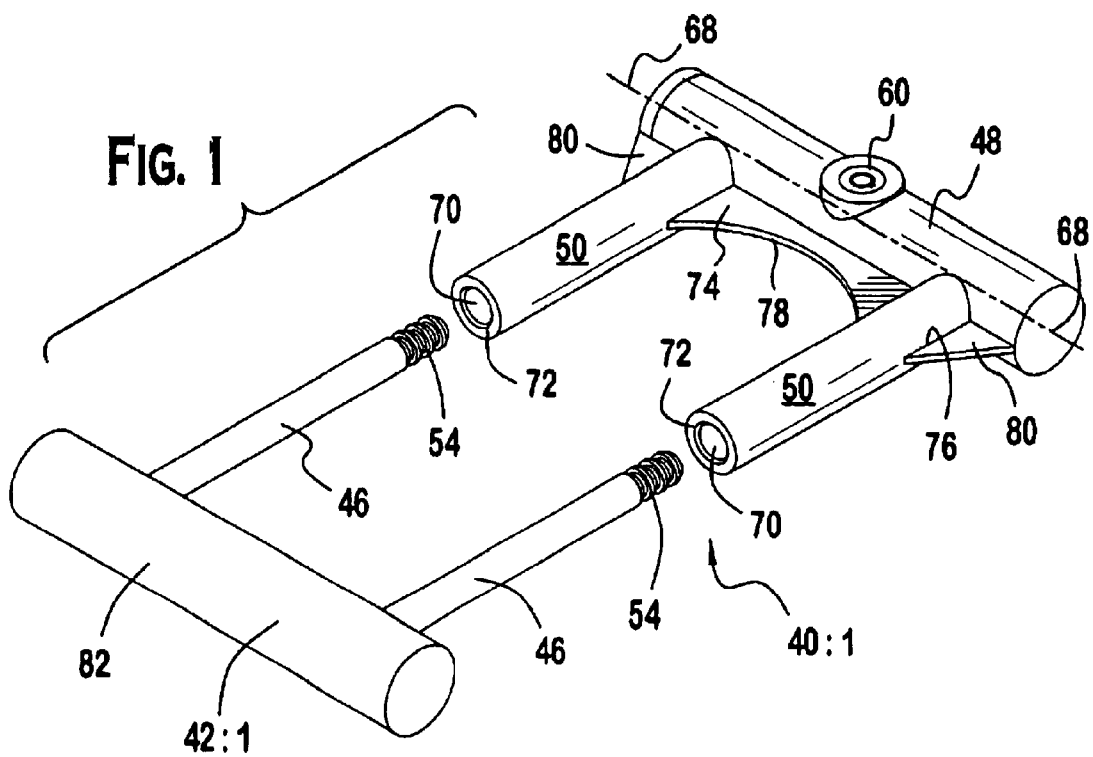
FIG. 1 is an exploded perspective view of a first preferred embodiment of a lock according to the present invention.

Certain terminology is used in the following description for convenience only and is not limiting. The words "right," "left," "top," and "bottom" designate directions in the drawings to which reference is made. The words "inwardly" and "outwardly" refer to directions toward and away from, respectively, the geometric center of the lock and designated parts thereof. This terminology includes the words above specifically mentioned, derivatives thereof, and words of similar import. Additionally, the words "a" and "one" are defined as including one or more of the referenced item unless specifically stated otherwise.

Referring to FIGS. 1–30, wherein like numerals indicate like elements throughout, multiple preferred embodiments of a lock according to the present invention are shown. Briefly stated, the lock 40:1–40:4 includes a lock member 48 that detachably engages a closure member 42 and that is tamper resistant.

It is preferred that the lock 40:1–40:4, and its individual components, is formed of high strength, durable, impact resistant material, such as hardened steel. Those of ordinary skill in the art will appreciate from this disclosure that any other suitable metals, steels, alloys, or the like that can be used to form the lock 40:1–40:4 without departing from the present invention. Preferably an outer surface of the lock 40:1–40:4 is coated with a brightly colored paint or coating, such as a fluorescent orange colored paint or vinyl coating, so that the lock 40:1–40:4 is prominently visible and noticeable when installed.

Referring to FIGS. 1–11, a first preferred embodiment of the lock 40:1 is shown. The lock 40:1 includes the lock member 48. It is preferred, but not necessary, that the lock member 48 has a generally cylindrical shape. Referring to FIG. 1, it is preferred that the lock member 48 has a generally elongated shaped and a longitudinal axis 68.

Two tubes 50 are disposed on the lock member 48. The two tubes 50 extend generally outwardly from the lock member 48 and preferable extend generally perpendicularly to the longitudinal axis 68. Those of ordinary skill in the art will appreciate from this disclosure that the two tubes 50 can be askew from perpendicular by up to approximately fifteen (15) degrees while still being considered "generally perpendicular" to the lock member 48.

While the tubes 50 are preferable generally cylindrical in shape, those of ordinary skill in the art will appreciate from this disclosure that the tubes 50 can have any cross-sectional shape, such as a triangular, square, octagonal, or other cross-sectional or shape without departing from the scope of the present invention. Each of the tubes 50 preferably defines a bore 70 therethrough and has a distal end 72 opposite from the lock member 48.

Figure 7:
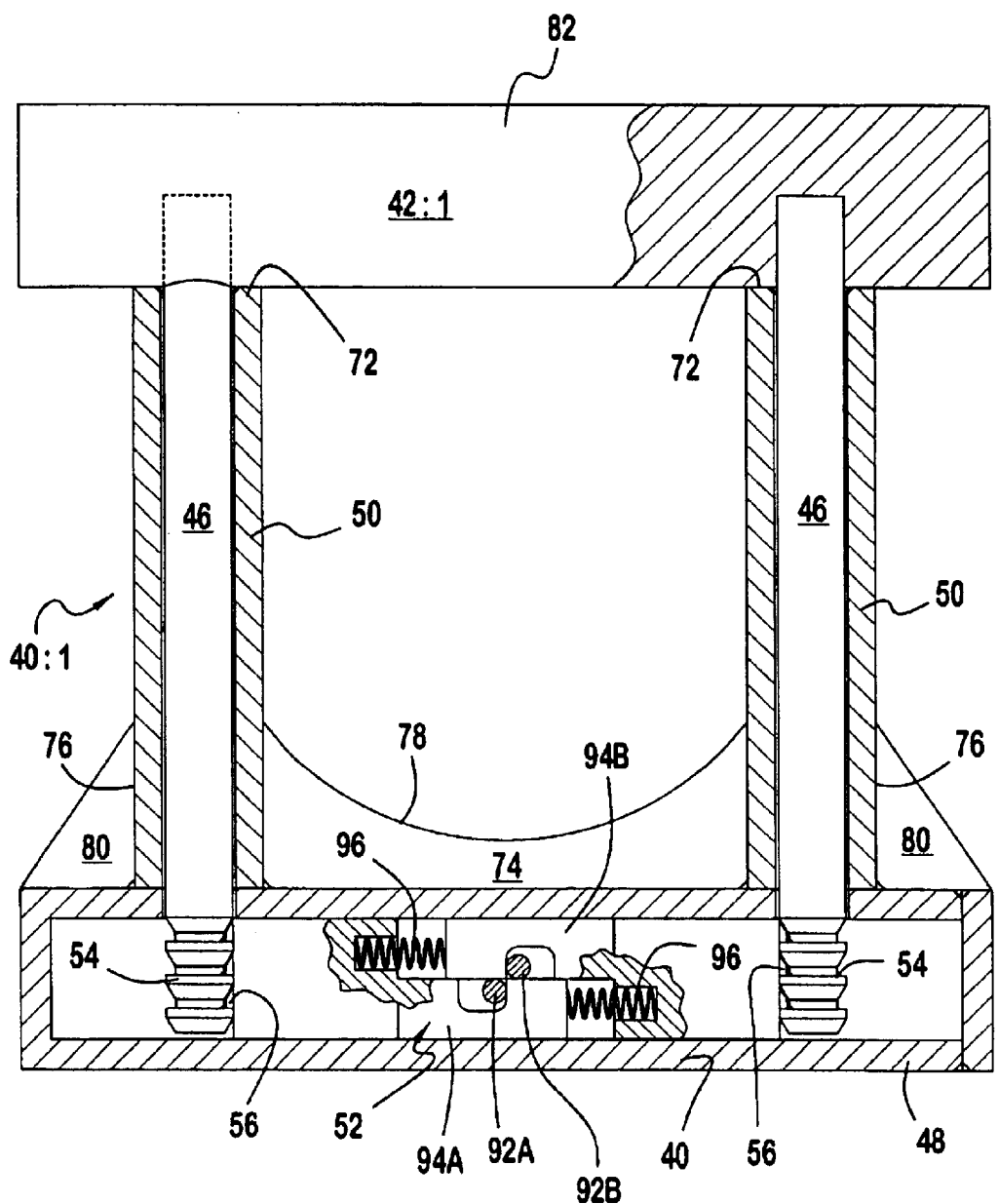
FIG. 7 is cross-sectional view of the lock of FIG. 2 as taken along the line 7—7 of FIG. 2 illustrating the preferred positive engagement of each of the shafts of the closure member by a locking mechanism disposed in the lock member.

As best shown in FIG. 7, it is preferable that a central flange 74 is positioned between the two tubes 50 to reinforce the two tubes 50 to resist bending thereof. Thus, the central flange 74 greatly increases the strength of the lock 40:1–40:4 and makes it exceedingly difficult, if not impossible, to disable the lock 40:1–40:4.

It is preferred that a side 78 of the central flange 74 opposite from the lock member 48 is curvilinear. By forming the side 78 of the central flange 74 as a curvilinear surface, it is more difficult for a potential thief to use a lever or similar spreading device to apply pressure between the lock member 48 and the closure member 42. While the curvilinear side 78 is shown as being concave when viewed from above, those of ordinary skill in art will appreciate from this disclosure that any curvilinear contour can be formed by side 78 of the central flange 74 without departing from the scope of the present invention.

It is also preferred that a tapered flange 80 is positioned between a surface 76, opposite from the central flange 74, of each of the two tubes 50 and the lock member 48. It is preferred that a separate tapered flange 80 is positioned on the left and right sides of the lock 40:1–40:4. It is also preferred that the tapered flanges 80 have a generally triangular shape. However, those of ordinary skill in the art will appreciate from this disclosure that the tapered flanges 80 can have any shape without departing from the scope of the present invention. The tapered flanges 80 make it difficult for a potential thief to use prying force against the left or right ends of the lock member 48. Levers or other spreaders will tend to slide downwardly and outwardly until they disengage from the lock 40:1–40:4.

It is preferred, but not necessary, that each of the tubes has generally the same length and is between approximately one (1) inch and approximately fifteen (15) inches in length. It is further preferred that each of the two tubes be between approximately four (4) inches and approximately eight (8) inches in length. It is further preferred that each of the tubes be approximately five (5) inches in length.

A closure member 42 preferably has a transverse part 82 that is preferably generally cylindrical and has two shafts 46 that extend generally perpendicularly therefrom. It is preferred, but not necessary, that the transverse part 82 of the closure member 42 and the lock member 48 are generally equally sized and shaped.

Referring to FIG. 14, a second preferred embodiment of the closure member 42:2 is shown. The closure member 42:2 preferably has a generally U-shape with a curved transverse part 82 and two generally parallel shafts 46. Referring to FIG. 15, a third preferred embodiment of the closure member 42:3 has a generally rectilinear shape preferably formed by three components oriented at generally ninety (90) degree angles to each other. It is preferred that the transverse part 82 form a generally ninety (90) degree angle with each of the shafts 46.

Referring to FIG. 19, a fourth preferred embodiment of the closure member 42:4 is shown. The closure member 42:4 has a generally U-shape with a bent transverse part 82 and two straight shafts 46. The closure member 42:4 preferably includes a separate capped collar 84 on each of the shafts 46. Referring to FIG. 20, when the closure member 42:4 is fully engaged the lock member 48, each of the capped collars is slideably positioned over the corresponding tube 50. Referring to FIG. 21, the capped collar 84 is preferably welded to the closure member 42:4 so that when the shaft 46 is inserted in the tube 50, the capped collar 84 overlaps the distal end 72 of the tube 50. Welds 86 are illustrated for example only.

Those of ordinary skill in the art will appreciate from this disclosure that the capped collars 84 can be integrally formed with the closure member 42:4 via a casting process or the like without departing from the scope of the present invention.

Referring to FIG. 25, a fifth preferred embodiment of the closure member 42:5 illustrates a U-shaped member having a reinforcement flange 64 positioned to reinforce the closure member 42:5. The shafts 46 of the closure member 42:5 include a notch 88 that can be used to engage the locking mechanism 52. While some of the preferred embodiments of the closures members 42:1–42:9 are shown as using ratchets, those of ordinary skill in the art will appreciate from this disclosure that a single notch 88 or the like can be used on one or both of the shafts 46 with any of the embodiments of the closure member 42:1–42:9 without departing from the scope of the present invention. Referring to FIG. 27, a cross-sectional view of the transverse part 82 and the reinforcement flange 64 is shown. While welds 86 are shown due to the preferable welding of the reinforcement flange 64 to the closure member 42:5, those of ordinary skill in the art will appreciate from this disclosure that the reinforcement flange can be integrally formed with the closure member 42:5 without departing from the present invention. As illustrated by FIG. 26, the closure member 42:5 can incorporate a reinforcement flange 64 having any shape. In FIG. 25, the reinforcement flange is shown as generally crescent shaped while in FIG. 26 the reinforcement flange 64 is shown as having a straight edge on a side opposite from the transverse part 82 of the closure member 42:5.

Figure 28:
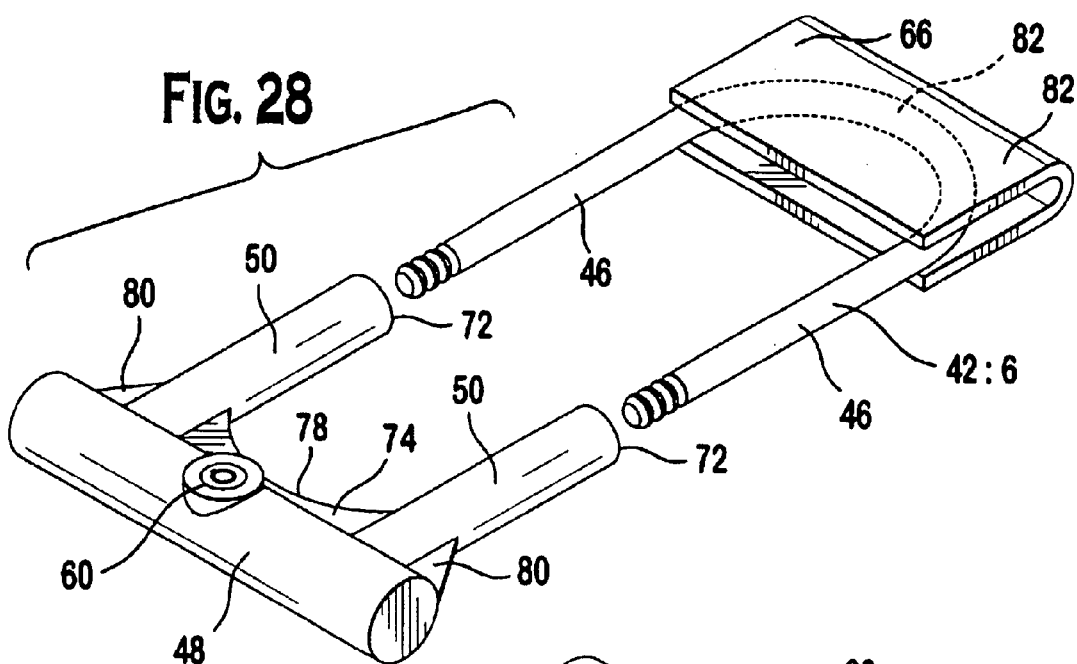
FIG. 28 is a perspective view of the lock member of FIG. 1 in combination with a sixth preferred embodiment of the closure member which has a reinforcement shield thereover.
Figure 29:
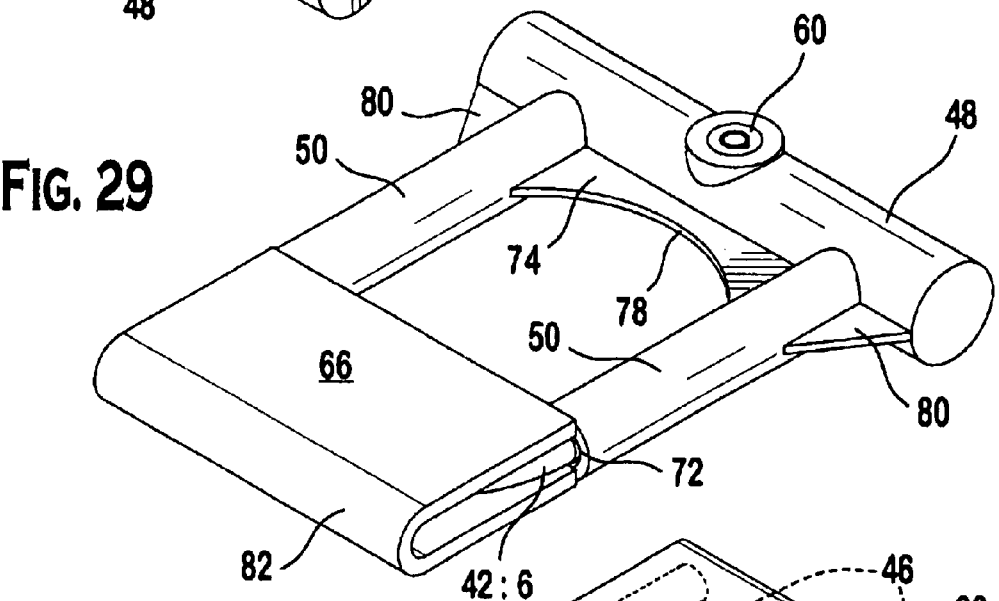
FIG. 29 is perspective view of a lock of FIG. 28 in the installed configuration.

Referring to FIG. 28, a sixth preferred embodiment of the closure member 42:6 is shown. The closure member 42:6 preferably includes a reinforcement shield 66 that is welded thereover to reinforce the closure member 42:6. While the transverse part 82 of the closure member 42:6 is generally bent to form a U-shape in combination with the shafts 46, those of ordinary skill in the art will appreciate from this disclosure that the transverse part 82 and the legs 46 can form any shape without departing from the scope of the present invention and can be used with the reinforcement shield 66 regardless of the particular shape or configuration used. Referring to FIG. 29, when a closure member 42:6 incorporating a reinforcement flange 66 is in the installed configuration, it is preferable that the inner edge of the reinforcement flange 66 abut the distal end 72 of the tube 50. It is also preferable that the top and bottom surfaces of the reinforcement flange 66 be generally flush with corresponding top and bottom diametric points on the tubes 50 and form tangents thereto.

Figure 30:
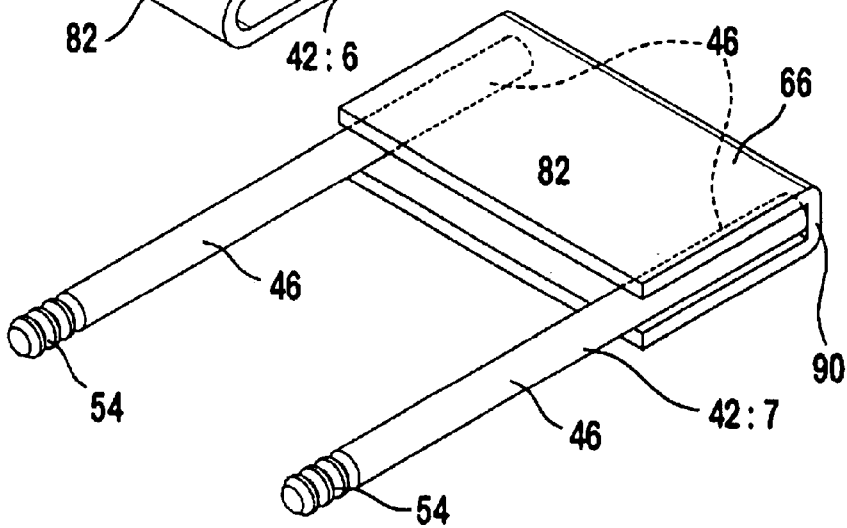
FIG. 30 is a perspective view of a seventh preferred embodiment of the closure member illustrating a reinforcement flange having a generally rectilinear upper right end which secures two shafts therein.
Figure 31:
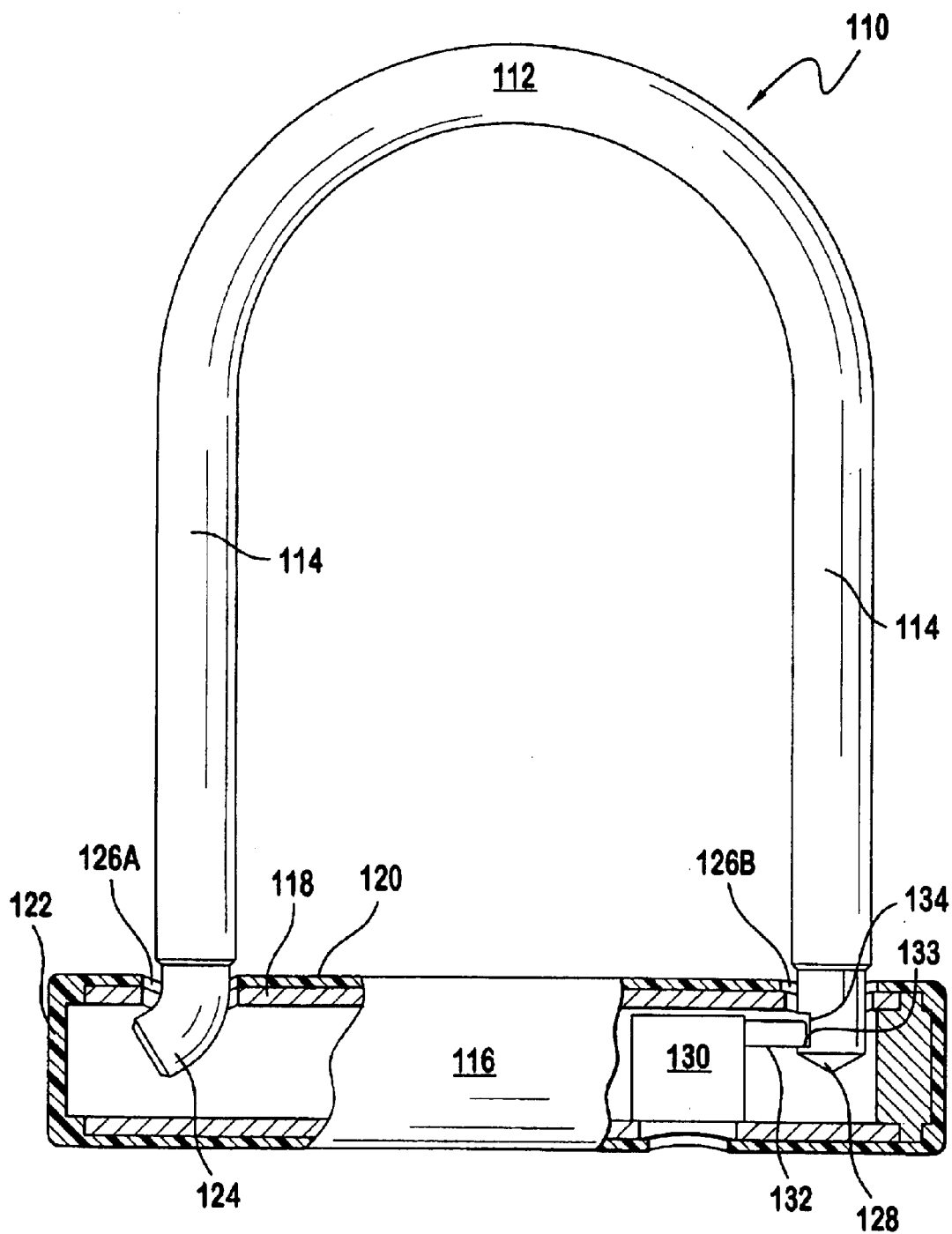
FIG. 31 is partial cross-sectional view of a prior art lock.

Referring to FIG. 30, a seventh preferred embodiment of the closure member 42:7 is shown. The closure member 42:7 includes a reinforcement shield 66 having a generally rectilinear folded end 90 shown in the upper right portion of FIG. 30. This closure member 42:7 uses the reinforcement shield 66 as the transverse part 82 and positions each of the shafts 46 within the reinforcement shield as shown. While various closure members 42:1–42:9 have been shown, those of ordinary skill in the art will appreciate from this disclosure that any of the closure members, or any of the features of the individual members 48 can be used with any of the lock members 48 to form the lock 40:1–40:4 of the present invention without departing from claimed invention.

Referring again to FIG. 7, it is preferable that the two shafts 46 are inserted through the two tubes 50 and detachably locked within the lock member 48 when the lock 40 is in the installed configuration. It is preferable, but not necessary, that the two tubes 50, in combination with the lock member 48, completely enclose the two shafts 46. While a portion of the two shafts 46 is seated within the transverse part 82 in the enlarged cross-section of FIGS. 4 and 6, those of ordinary skill in the art will appreciate from this disclosure that the terms "shaft" or "shafts", as used in the claims, is defined to only include the portion of the shafts 46 that extend outwardly past the outer surface of the transverse part 82.

Figure 2:
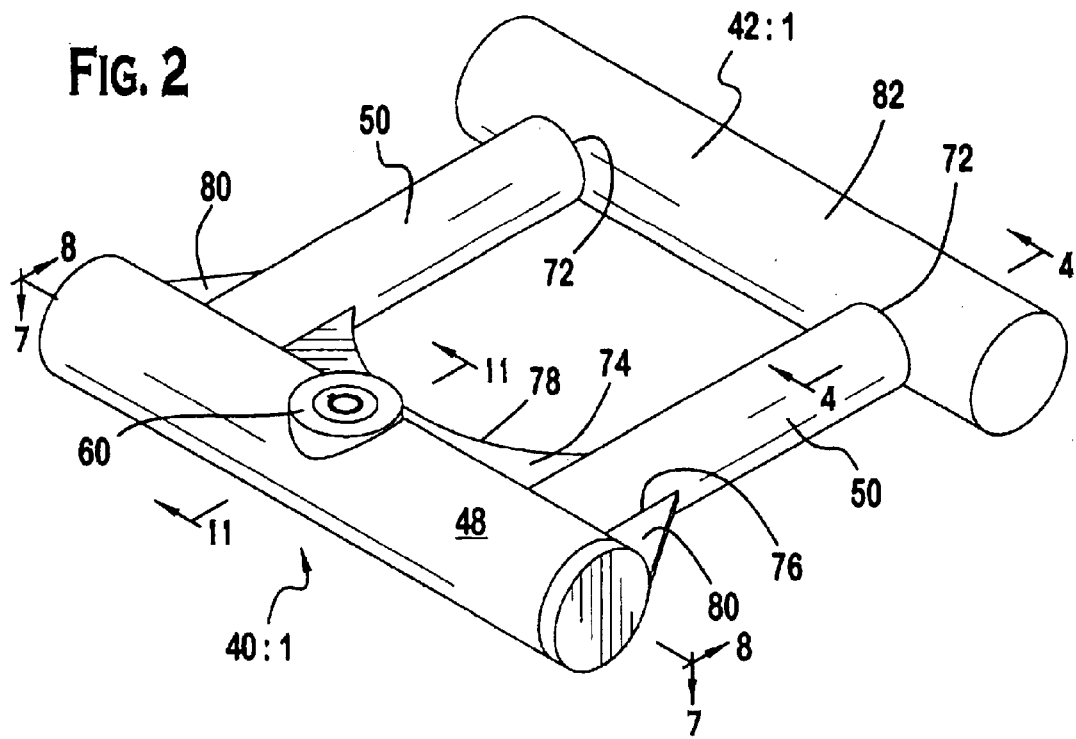
FIG. 2 is a perspective view of the lock of FIG. 1 in an installed configuration.

Referring to FIGS. 2 and 7, it is preferred that the distal end 72 of the tubes 50 each abut a separate portion of a surface of the closure member 42:1–42:9 on which one of the two shafts 50 is positioned when the lock 10 is in installed configuration.

Referring to FIGS. 5 and 6, one alternative embodiment of the closure member 42:1 includes at least two grooves 44 therein each extending around a perimeter of one of the two shafts 46. Each of the at least two grooves 44 receives the distal end 72 of one of the two tubes 50 when the lock 10 is in the installed configuration. As shown in FIG. 6, this allows the distal end 72 of the tubes 50 to lodge within the transverse part 82 of the closure member 42:1–42:9 to eliminate a thief's ability to apply prying force between the tubes 50 and the transverse part 82 in a direction generally parallel to the longitudinal axis of one of the shafts 46. This further increases the tamper resistance of the lock 10.

Figure 8:
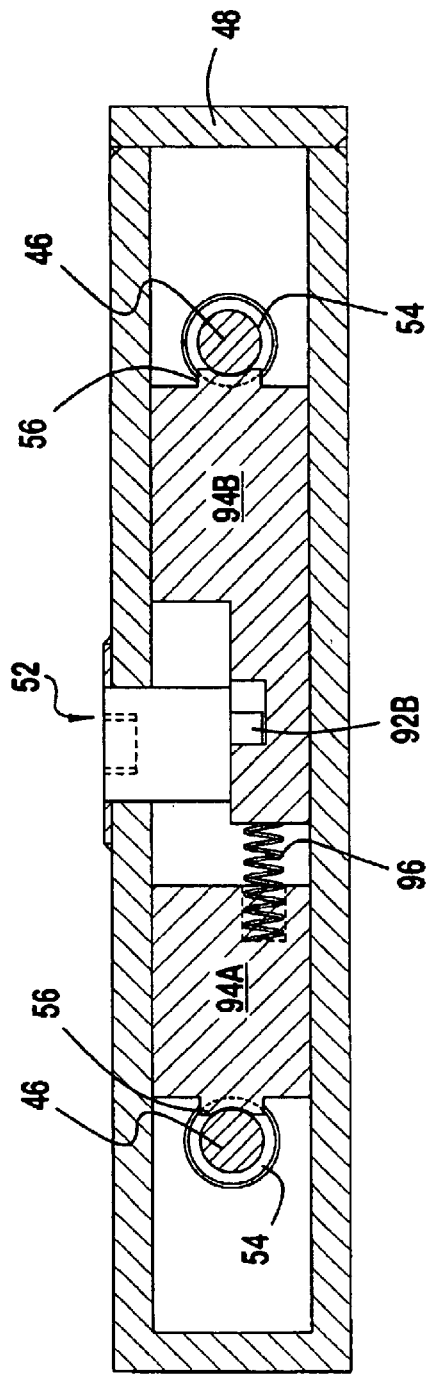
FIG. 8 is a cross-sectional view of the lock of FIG. 2 as taken along the line 8—8 of FIG. 2 illustrating the preferred positive engagement of each of the shafts of the closure member by the locking mechanism 52.

Referring to FIGS. 7 and 8, a locking mechanism 52 detachably locks the closure member 42:1–42:9 to the lock member 48 once the lock 40:1–40:4 is in the installed configuration wherein the two tubes 50 substantially cover the two shafts 46.

As also shown in FIG. 7, the locking mechanism 52 includes first and second lock fingers 92A, 92B that are operated by rotation of a tumbler mechanism (not shown in FIG. 7). The first and second lock fingers 92A, 92B can be used to move first and second lock slides 94A, 94B out of their biased position (as shown in FIG. 7). The first and second lock slides 94A, 94B have a biased position in which their corresponding catches 56 engage ratchets 54 in the corresponding shaft 46 to secure the closure member 42:1–42:9 in the lock member 48. The first and second lock slides 94A, 94B are maintained in their biased position by springs 96 that bias each lock slide 94A, 94B away from its respective spring 96 and toward an engagement point with one of the shafts 46. FIG. 8 illustrates the engagement between a lock catch 56 and shaft ratchet 54.

Figure 9:
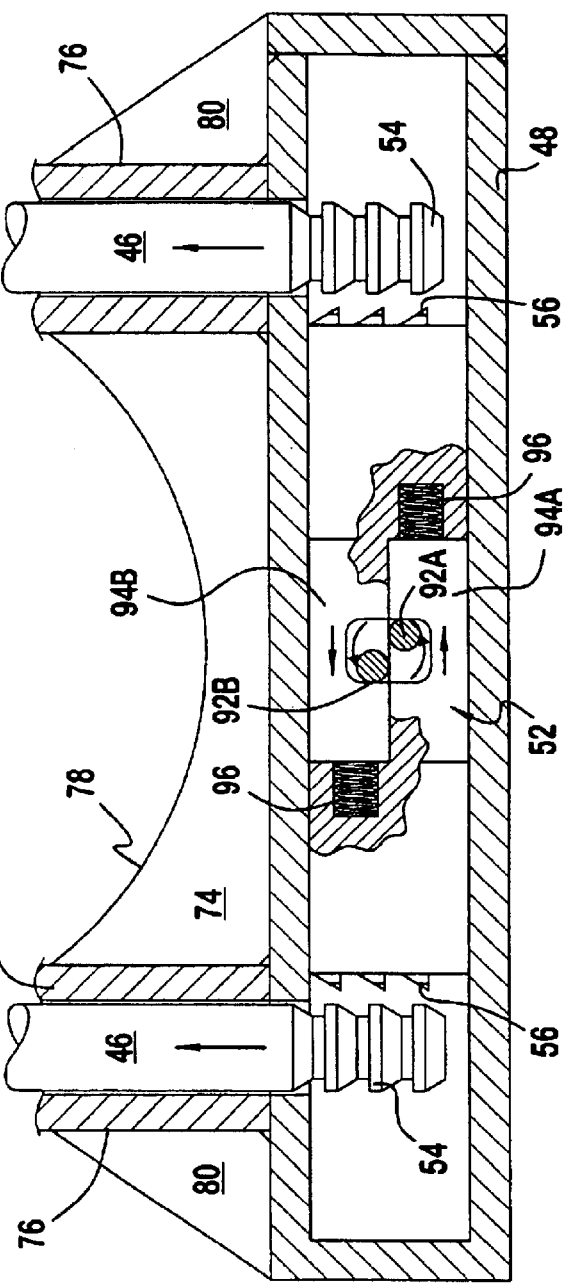
FIG. 9 is view similar to that of FIG. 7 illustrating the locking mechanism manipulated to disengage lock catches from the shafts of the closure member to allow the closure member to be removed from the lock member.

Referring to FIG. 9, the lock tumbler 58 can be rotated to drive the first and second fingers 92A, 92B against a portion the corresponding lock block 94A, 94B to compress the biasing spring 96 and slide the respective lock block 94A, 94B generally away from a contact point with the shaft 46. When the lock fingers are 92A, 92B so rotated, the closure member 42:1–42:7 can be freely removed from the lock member 48. Referring to FIG. 10, the shaft 46 can preferably be inserted into the lock member 48 without rotating the lock fingers 92A, 92B due to the sliding engagement of the shaft ratchets 54 and the beveled edges of the lock catches 56 which cause the lock slides 94A, 94B to be displaced out of the biasing position to allow the full insertion of the shaft 46. Once the shafts 46 are fully inserted into the lock member 48, the upper flat side of the ratchets 54 engages the lower flat side of the catches 56 to prevent the withdrawal of the shaft 46 without activating the tumbler 58 via a key or the like to move the first and second lock fingers 92A, 92B against the first and second lock slides 94A, 94B, as discussed above. FIG. 11 illustrates a cross-sectional view of the tumbler 58 and the corresponding first and second lock fingers 92A, 92B.

Figure 13A:
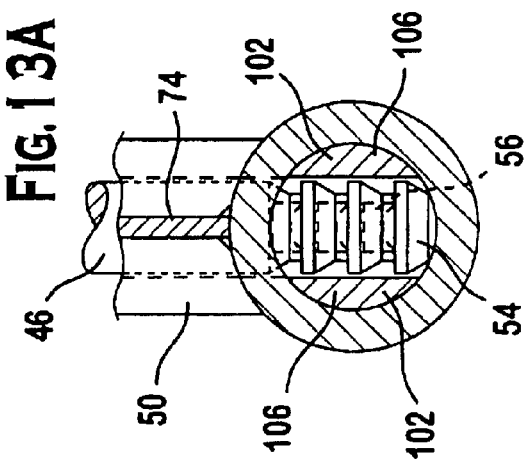
FIG. 13A is cross-sectional view of the lock of FIG. 13 as taken along the line 13A—13A in FIG. 13 illustrating the two preferred lock slides used to drive the catches of a slot assembly out of the equilibrium position.
Figure 12:
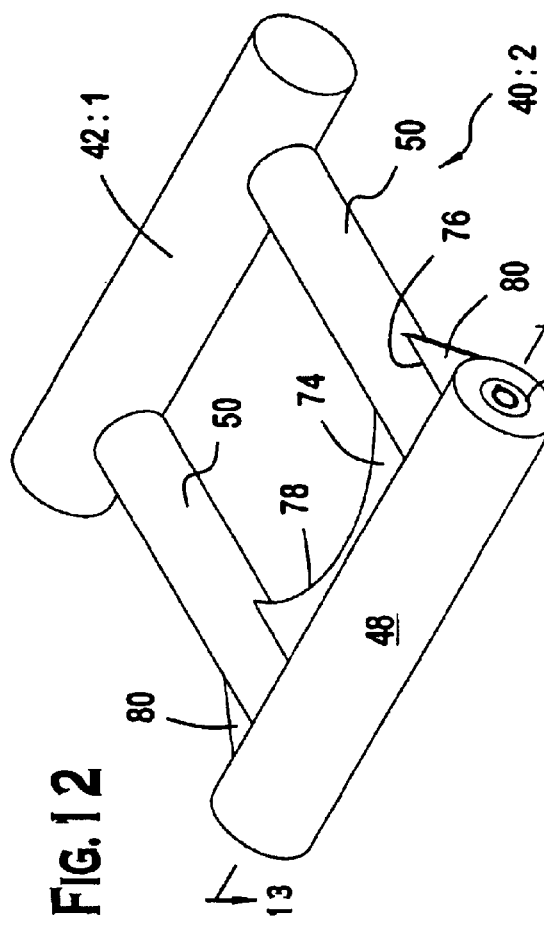
FIG. 12 is a perspective view of a second preferred embodiment of the lock according the present invention illustrating the keyed portion of the locking mechanism located on an end of the lock member.
Figure 13:
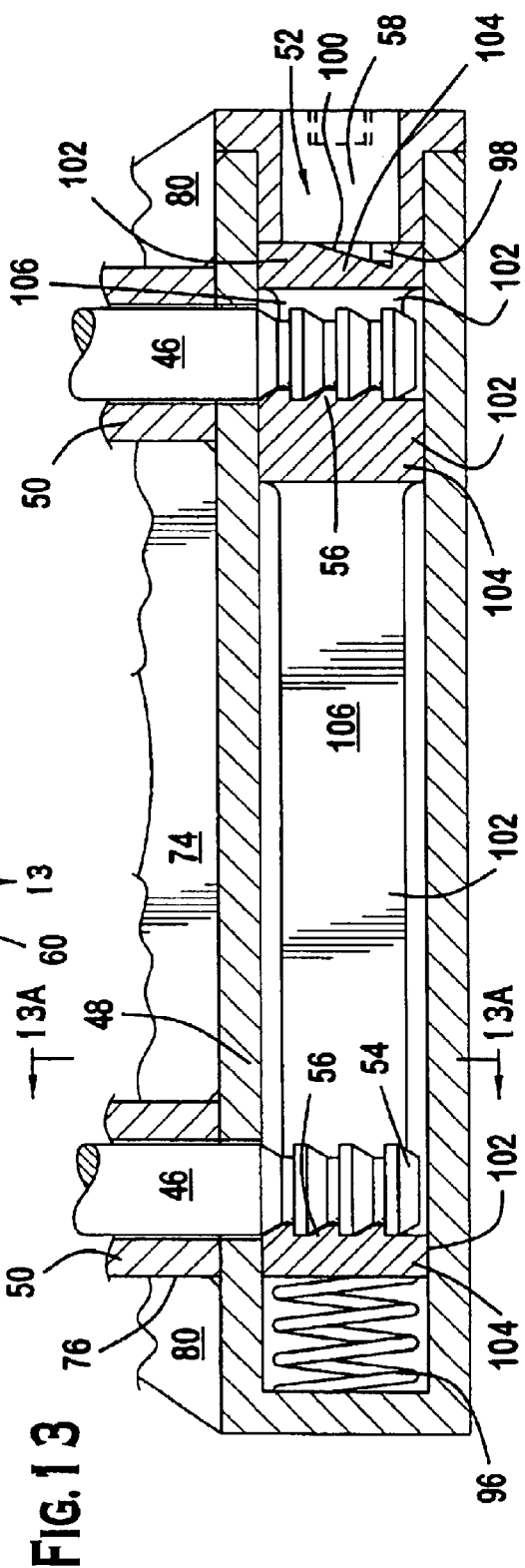
FIG. 13 is a partial cross-sectional view of the lock of FIG. 12 illustrating a preferred embodiment of the locking mechanism used to positively engage each of the shafts of the closure member when the keyed portion of the locking mechanism is located on an outer end of the lock member.

While one preferred locking mechanism is shown and described, those of ordinary skill in art will appreciate from this disclosure that any locking mechanism 52 can be used with the lock 40:1–40:4 of the present invention without departing therefrom. For example, the keyed portion 60 of the tumbler 58 can be located on a right or left end of the lock member 48 as shown in FIG. 12. Referring to FIGS. 13 and 13A, the locking mechanism 52 can positively engage each of the two shafts 46 to secure the two shafts 46 within the lock member 48 regardless of where the tumbler 58 is positioned.

Referring to the right side of FIG. 13, a lock finger 98 can be rotated in a shaped groove 100 to leftwardly displace a sliding assembly 102. The sliding assembly 102 is preferably formed by multiple connected blocks 104 and lock slides 106. As shown in left portion of FIG. 13, a spring 96 biases the sliding assembly 102 generally rightwardly and into engagement with each of the shafts 46. The sliding assembly 102 is shown in the equilibrium position in which the spring 96 has positioned the catches 56 at the shaft contact point. To disengage the shafts 46 from the catches 56 of a sliding assembly 102, a user rotates the lock finger 98 via the tumbler mechanism 58 to drive the rightmost block 104 generally leftwardly. This leftwardly motion of the rightmost block 104 is mirrored by whole lock assembly 102. Thus, the lock finger 98 is capable of driving the catches 56 generally leftwardly out of engagement with the ratchets 54 to allow removal of the shafts 46 from the lock member 48.

While both of the described locking mechanisms 52 are designed for engagement with shafts 46 having ratchets 54 thereon, those of ordinary skill in the art will appreciate from this disclosure that these locking mechanisms, or any other, can also be used with shafts 46 having a single notch 88 therein, such as those shafts 46 shown in FIGS. 25 and 26.

Referring to FIGS. 16–18, a third preferred embodiment of the lock 40:3 is shown. The lock 40:3 has tubes 50 with distal ends 72 having an inwardly beveled surface 108. These inwardly beveled surfaces 108 are configured to compliment the beveled edges 140 of the thickened portion 62 of the closure member 42. Those of ordinary skill in the art will appreciate from this disclosure that the closure members 42 in FIGS. 16–18 and 22–24 can be freely interchanged with any of the embodiments shown and described in this application. The angled mating beveled edges 140, 108 of the lock 40:3 generally eliminates a pry point for thieves and further enhances the tamper resistance of the lock 40:3. Referring specifically to FIG. 18, a portion of the beveled surface 140 can be irregular to allow welds 86 along the shafts 46 without interfering with the cooperative abutting fit between the inwardly beveled surface 108 of the tubes 50 and the beveled surfaces 140 of the thickened portion 62 of the closure member 42.

Referring to FIGS. 22–24, a fourth preferred embodiment of the lock 40:4 allows the distance between the side 78 of the central flange 74 and the inner surface of the transverse part 82 of the closure member 42 to be adjustable depending upon the application for which the lock 40:4 is used. This adjustability is achieved by positioning the locking mechanism 52 on one of the tubes 50. The locking mechanism 52 can engage ratchets 54 anywhere along the length of one of the shafts 46. As shown in FIG. 24, the tumbler mechanism 58 operates a lock finger 98 to manipulate a lock slide 142. The lock block 142 is biased so that catch 56 is maintained at shaft engaging point by a spring 96. In a fashion similar to that described above in conjunction with FIG. 10, the ratchets 54 of at shaft 46 can be inserted into the tube 50 without a user having to operate the tumbler mechanism 58. This, in combination with the biasing of the lock slide 142 toward the shaft engaging point, results in the lock 40:4 being self-locking. Once the lock 40:4 has been adjusted to the desired size, the lock slide 142 is biased by spring 96 to engage the catch 56 with the flat left surface of one of the ratchets 54 to maintain the shaft 46 within tube 50. To release the closure member 42, a user operates the tumbler mechanism 58 to move the lock finger 98 downward against the lower portion of the lock slide 142 to disengage the catch 56 from the ratchets 54.

Referring to FIGS. 1–7, one embodiment of the present invention operates as follows. A user positions the closure member 42:1 so that the shafts 46 are aligned with bores 70 in tubes 50 and inserts the shafts 46 into the tubes 50. Referring to FIG. 10, it is preferred that as the lower beveled surfaces of the ratchets 54 engage the top beveled edges of the catches 56, the shafts 46 displace the first and second lock slides 94A, 94B to allow the shaft 46 to be fully engaged with the lock member 48. When the user decides to disengage the lock, the user manipulates the tumbler mechanism 58 to disengage the catches 56 from the ratchets 54 as described above.

While various shapes, configurations, lock positions, and tamper resistant features have been described above in various embodiments of the present invention, those of ordinary skill in the art will appreciate from this disclosure that any combination of the above features, flanges, closure members, lock members or the like can be used without departing from the scope of the present invention. For example, the locks 40:1–40:4 can have more than three tubes 50 without departing from the scope of the present invention. It is recognized by those skilled in the art, that changes may be made to the above described embodiments of the invention without departing from the broad inventive concept thereof. It is understood, therefore, that this invention is not limited to the particular embodiments disclosed, but is intended to cover all modifications which are within spirit and scope of the invention as defined by the appended claims and/or shown in the attached drawings.

What is claimed is:

1. A cycle lock that is tamper resistant, the cycle lock comprising:
   a lock member;
   two tubes disposed on the lock member, each of the two tubes extending generally outwardly therefrom and each defining a bore therethrough;
   a closure member including two shafts, the two shafts being inserted through the two tubes and detachably locked within the lock member when the cycle lock is in an installed configuration, the two shafts being separable from the two tubes when the two shafts are not locked within the lock member, wherein while the cycle lock is in the installed configuration the closure member and the lock member define an enclosed space sufficient to contain a portion of a cycle frame and a fixed object; and
   a locking mechanism detachably locking the closure member to the lock member when the cycle lock is in the installed configuration wherein the two tubes substantially cover the two shafts.

2. The cycle lock of claim 1, wherein the two tubes, in combination with the lock member, completely enclose the two shafts.

3. The cycle lock of claim 1, wherein each of the two tubes has a distal end opposite from the lock member, each of the distal ends abuts a separate portion of a surface of the closure member on which one of the two shafts is positioned when the cycle lock is in the installed configuration.

4. The cycle lock of claim 1, wherein the closure member includes at least two grooves therein each extending around a perimeter of one of the two shafts, each of the at least two grooves receives the distal end of one of the two tubes when the cycle lock is in the installed configuration.

5. The cycle lock of claim 1, wherein a central flange is located between the two tubes to reinforce the two tubes to resist bending thereof.

6. The cycle lock of claim 5, wherein a tapered flange is positioned between a surface, opposite from the central flange, of each of the two tubes and the lock member.

7. The cycle lock of claim 5, wherein a side of the central flange opposite from the lock member is curvilinear.

8. The cycle lock of claim 1, wherein each of the two tubes is between approximately one (1) inch and approximately fifteen (15) inches in length.

9. The cycle lock of claim 8, wherein each of the two tubes is between approximately four (4) and approximately eight (8) inches in length.

10. The cycle lock of claim 9, wherein each of the two tubes is approximately five (5) inches in length.

11. The cycle lock of claim 1, wherein the lock member is generally cylindrically shaped and the two tubes extend generally perpendicularly therefrom.

12. The cycle lock of claim 11, wherein the closure member has a transverse part that is generally cylindrical and the two shafts extend generally perpendicularly therefrom.

13. The cycle lock of claim 12, wherein the transverse part and the lock member are generally equally sized and shaped.

14. The cycle lock of claim 1, wherein the locking mechanism positively engages each of the two shafts to secure the two shafts within the lock member.

15. The cycle lock of claim 1, wherein the lock member and the closure member are formed of hardened steel.

16. A cycle lock that is tamper resistant, the cycle lock comprising:
    a lock member having a generally elongated shape and a longitudinal axis;
    two tubes disposed on the lock member, each of the two tubes extending generally outwardly therefrom and each defining a bore therethrough, each of the two tubes extending generally perpendicularly to the longitudinal axis;
    a closure member including a transverse part having an outer surface and two shafts located on the outer surface, the two shafts being inserted through the two tubes and detachably locked within the lock member when the cycle lock is in an installed configuration, the two shafts being separable and detachable from the two tubes when the two shafts are not locked within the lock member, wherein while the cycle lock is in the installed configuration the closure member and the lock member define an enclosed space sufficient to contain a portion of a cycle frame and a fixed object; and
    a locking mechanism detachably locking the closure member to the lock member when the cycle lock is in the installed configuration wherein the two tubes, in combination with the lock member, completely enclose the two shafts.

17. The cycle lock of claim 16, wherein each of the two tubes has a distal end opposite from the lock member, each of the distal ends abuts a separate portion of a surface of the closure member on which one of the two shafts is positioned when the cycle lock is in the installed configuration.

18. The cycle lock of claim 16, wherein the closure member includes at least two grooves therein each extending around a perimeter of one of the two shafts, each of the at least two grooves receives the distal end of one of the two tubes when the cycle lock is in the installed configuration.

19. The cycle lock of claim 18, wherein a central flange is located between the two tubes to reinforce the two tubes to resist bending thereof.

20. The cycle lock of claim 19, wherein a tapered flange is positioned between a surface, generally opposite from the central flange, of each of the two tubes and the lock member.

21. The cycle lock of claim 20, wherein each of the two tubes is between approximately four (4) and approximately eight (8) inches in length.

22. A multi-purpose lock, the lock comprising:
- a lock member formed by a first elongated rod having an outer perimeter surface;
- two tubes disposed on the outer perimeter surface of the first elongated rod each of the two tubes extending generally outwardly therefrom and each defining a bore therethrough;
- a closure member formed by a second elongated rod which has two shafts extending therefrom, the two shafts being inserted through the two tubes and detachably locked within the lock member when the multi-purpose lock is in an installed configuration, the two shafts being separable from the two tubes when the two shafts are not locked within the lock member, wherein when the multi-purpose lock is in the installed configuration the closure member and the lock member define an enclosed area sufficient to contain a portion of a cycle frame and a fixed object; and
- a locking mechanism detachably locking the closure member to the lock member when the multi-purpose lock is in the installed configuration wherein the two tubes substantially cover the two shafts.

23. The multi-purpose lock of claim 22, wherein a distance between the first and second elongated rods is fixed when the lock is in the installed configuration.

24. The multi-purpose lock of claim 23, wherein the orientation of the lock member and the two tubes cannot be changed relative to the closure member when detachably locking the lock member to the closure member.

25. The multi-purpose lock of claim 23, wherein the bore in each of the two tubes is only open on one end.

26. The multi-purpose lock of claim 22, wherein while the lock is in the installed configuration, the distance between the first and second elongated rods is not adjustable.

27. The multi-purpose lock of claim 24, wherein the first and second elongated tubes are generally parallel.

28. A lock, comprising:
- a lock member formed by a first elongated rod having an outer perimeter surface;
- two tubes disposed on the outer perimeter surface of the first elongated rod, each of the two tubes extending generally outwardly therefrom and each defining a bore therethrough;
- a closure member formed by a second elongated member which has two shafts extending therefrom, the two shafts being inserted through the two tubes and detachably locked within the lock member when the lock is in an installed configuration, the two shafts being separable from the two tubes when the two shafts are not locked within the lock member, wherein while the lock is in the installed configuration the closure member and lock member define an enclosed area sufficient to contain a portion of a trailer frame and a fixed object; and
- a locking mechanism detachably locking the closure member to the lock member when the lock is in the installed configuration wherein the two tubes substantially cover the two shafts.

* * * * *